(12) United States Patent
Hirai

(10) Patent No.: US 7,529,920 B2
(45) Date of Patent: May 5, 2009

(54) APPARATUS AND METHOD CAPABLE OF EXECUTING PLUG AND PLAY INSTALLATION PROCESSING OPERATION UPON ACQUIRING ONE PIECE OF DEVICE IDENTIFICATION INFORMATION INCLUDING BOTH PRINTER AND FACSIMILE IDENTIFICATION INFORMATION

(75) Inventor: Nobuyuki Hirai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 412 days.

(21) Appl. No.: 11/149,013

(22) Filed: Jun. 9, 2005

(65) Prior Publication Data

US 2005/0278521 A1 Dec. 15, 2005

(30) Foreign Application Priority Data

Jun. 11, 2004 (JP) ............................. 2004-174059

(51) Int. Cl.
G06F 15/177 (2006.01)
G06F 9/00 (2006.01)
G06F 3/00 (2006.01)

(52) U.S. Cl. ............................... 713/1; 713/100; 710/8
(58) Field of Classification Search ..................... 713/1, 713/100; 719/321
See application file for complete search history.

(56) References Cited

U.S. PATENT DOCUMENTS

| 5,655,148 | A * | 8/1997 | Richman et al. ............... 710/8 |
| 6,195,172 | B1 * | 2/2001 | Minamizawa .............. 358/1.15 |
| 6,822,753 | B1 * | 11/2004 | Momose ..................... 358/1.13 |
| 7,047,528 | B2 * | 5/2006 | Iida ............................. 717/170 |
| 2002/0083228 | A1 * | 6/2002 | Chiloyan et al. ............... 710/9 |
| 2003/0093768 | A1 * | 5/2003 | Suzuki ........................ 717/100 |
| 2003/0120624 | A1 | 6/2003 | Poppenga et al. |
| 2004/0123305 | A1 * | 6/2004 | Kim et al. .................... 719/321 |
| 2004/0267973 | A1 * | 12/2004 | Sumida et al. ................. 710/8 |

FOREIGN PATENT DOCUMENTS

| CN | 1456976 | 11/2003 |
| JP | 2003-216378 A | 7/2003 |
| WO | 03065188 | 8/2003 |

\* cited by examiner

*Primary Examiner*—Suresh K Suryawanshi
(74) *Attorney, Agent, or Firm*—Canon U.S.A. Inc., I.P. Division

(57) ABSTRACT

The present invention relates to an information processing apparatus capable of executing plug and play processing for starting up one installation processing operation upon acquiring one device identification information item. The information processing apparatus includes an acquisition unit for acquiring at least one device identification information item including a plurality of configuration information items corresponding to each of a plurality of logical interfaces in response to connection of a peripheral device. The information processing apparatus further includes an installation control unit for controlling execution of installation of a plurality of device drivers corresponding to the plurality of logical interfaces, respectively, by the use of the plurality of configuration information items included in the at least one device identification information item when the acquisition unit acquires the at least one device identification information item from the peripheral device.

17 Claims, 6 Drawing Sheets

<DEVICE ID STRING FOR Interface1>
MFG: XXX; MDL: YYY (Printer); CMD: Printer Language;
        CLS: PRINTER; DES: XXX YYY (Printer)

402

<DEVICE ID STRING FOR Interface2>
MFG: XXX; MDL: YYY (FAX); CMD: FAX Language;
        CLS: PRINTER; DES: XXX YYY (FAX);

APPARATUS AND METHOD CAPABLE OF EXECUTING PLUG AND PLAY INSTALLATION PROCESSING OPERATION UPON ACQUIRING ONE PIECE OF DEVICE IDENTIFICATION INFORMATION INCLUDING BOTH PRINTER AND FACSIMILE IDENTIFICATION INFORMATION

BACKGROUND OF THE INVENTION

1. Field of the Invention

The present invention relates to image processing apparatuses, image processing systems, and methods for controlling image processing apparatuses and systems.

2. Description of the Related Art

Single image processing apparatuses that provide information processing terminals connected thereto via interfaces (I/Fs) with a plurality of functions, including a printer function, a scanner function, and a facsimile (hereinafter, referred to as a FAX) function, are well known as multifunction devices. To use these image processing apparatuses on the information processing terminals, driver software for the printer, scanner, and FAX needs to be installed in each of the information processing terminals in most cases.

The Microsoft Windows® operating system (OS) includes a plug and play function for automatically detecting the device type of the image processing apparatus connected to the information processing apparatus and automatically installing a driver appropriate for the detected device type. The plug and play function allows a device ID to be acquired from the image processing apparatus and a driver corresponding to the device ID to be installed (Japanese Patent Laid-Open No. 2003-216378).

Unfortunately, since a single device ID has a plurality of corresponding drivers, an operator needs to select drivers to be installed and install drivers individually. In other words, the plug and play function is not easy for operators to use.

Furthermore, if the same logical interface is shared by a plurality of functions each having a corresponding device driver, header information for identifying a command needs to be added. In addition, the information processing apparatus needs to be constructed so as to refer to the command header section. In short, the performance in both the information processing terminal and the image processing apparatus is degraded due to a complicated control procedure and increased overhead.

Some image processing apparatuses have a USB (universal serial bus) HUB to which a printer function, a FAX function, and a scanner function are connected. However, these image processing apparatuses are generally expensive.

SUMMARY OF THE INVENTION

Embodiments according to the present application include the features described below.

According to an aspect of the present invention, an information processing apparatus capable of executing plug and play processing for starting up one installation processing operation upon acquiring one device identification information item includes: an acquisition unit configured to acquire at least one device identification information item including a plurality of configuration information items corresponding to each of a plurality of logical interfaces in response to connection of a peripheral device; and an installation control unit configured to control execution of installation of a plurality of device drivers corresponding to the plurality of logical interfaces by using the plurality of configuration information items included in the at least one device identification information item when the acquisition unit acquires the at least one device identification information item from the peripheral device.

According to another aspect of the present invention, an information processing method capable of executing plug and play processing for starting up one installation processing operation upon acquiring one device identification information item includes steps of: acquiring at least one device identification information item including a plurality of configuration information items corresponding to each of a plurality of logical interfaces in response to connection of a peripheral device; and controlling execution of installation of a plurality of device drivers corresponding to the plurality of logical interfaces by using the plurality of configuration information items included in the at least one device identification information item when the acquisition unit acquires the at least one device identification information item from the peripheral device.

According to still another aspect of the present invention, a control program causes a computer to execute the above-described method.

All driver software programs required to install drivers can be automatically installed. This provides an easy installation method by eliminating the need for an operator to follow a complicated procedure.

Other features and advantageous of the present invention will be apparent from the following description taken in conjunction with the accompanying drawings, in which like reference characters designate the same or similar parts throughout.

BRIEF DESCRIPTION OF THE DRAWINGS

FIG. 4 is a drawing depicting identifier information included in the USB function control section.

DESCRIPTION OF THE EMBODIMENTS

Figure 1:
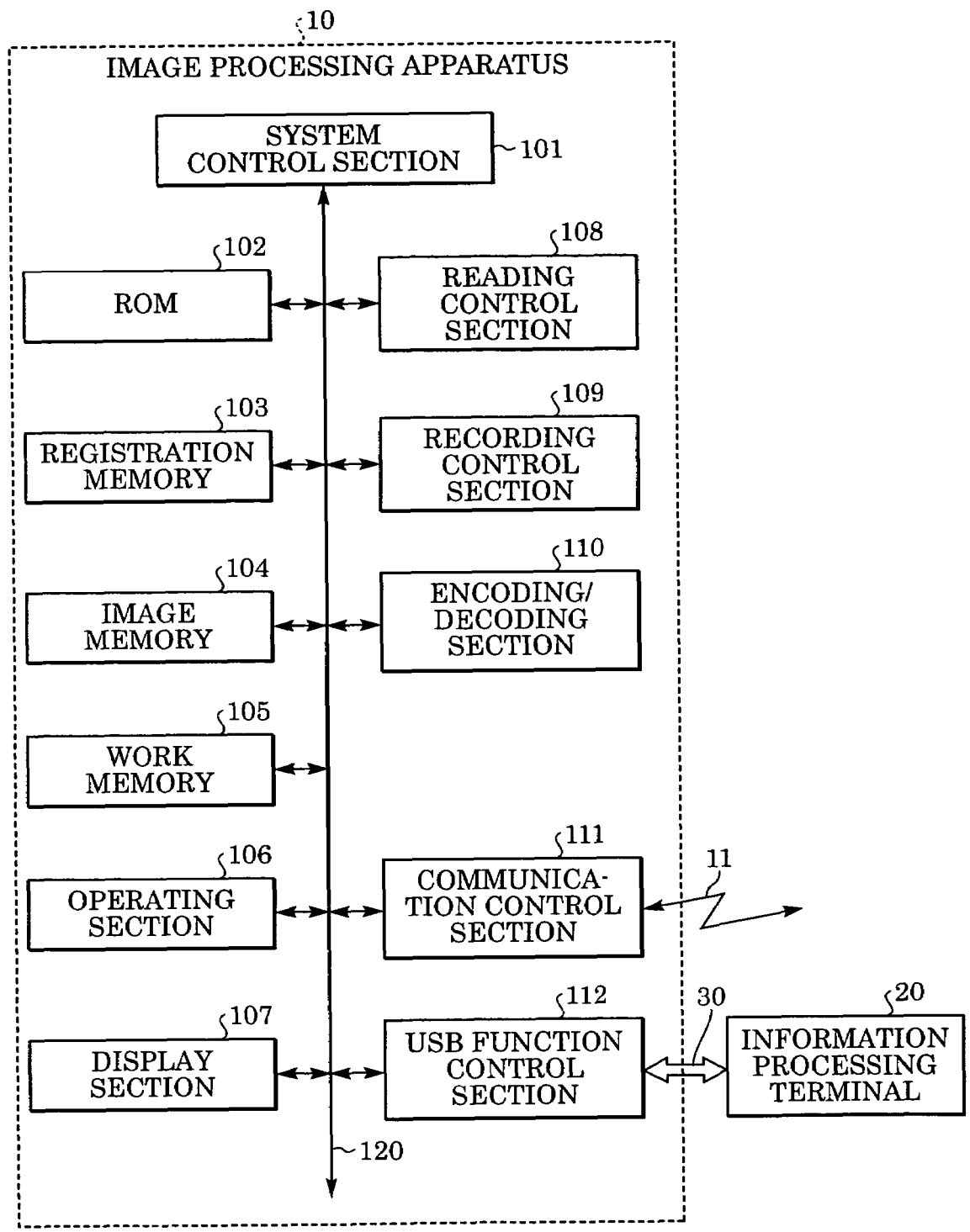
FIG. 1 is a block diagram depicting the basic structure of an image processing apparatus according to an embodiment of the present invention.

FIG. 1 is a block diagram depicting the basic structure of an image processing apparatus 10.

A system control section 101 controls the operation of the apparatus via a system bus 120. A read-only memory (ROM) 102 stores, for example, a control program of the system control section 101. A registration memory 103 includes, for example, a battery-backup static random access memory (SRAM) or a flash memory. It stores, for example, settings registered by an operator and management data of the apparatus. An image memory 104 includes, for example, a dynamic random access memory (DRAM). It accumulates image data. A work memory 105 includes, for example, a DRAM. It stores, for example, a program control variable. An operating section 106 includes, for example, various keys. It is used by an operator to perform various inputs. A display section 107 includes, for example, a liquid crystal display (LCD) and a light emitting diode (LED). The display section 107 outputs various visual and auditory information.

A reading control section 108 includes, for example, an image sensor such as a charge-coupled device (CCD) and a CS (contact sensor) and an image processing control section. The reading control section 108 reads a document optically, converts it into electrical image data, subjects the electrical image data to various types of image processing, such as color processing, binarization processing, and half-tone processing, and outputs high-resolution image data. The reading control section 108 supports at least one of an ADF (auto document feeder) system for reading the documents in the ADF while transferring one document at a time and a document glass system for reading the document on the document glass without moving the document.

A recording control section 109 includes, for example, a printer such as a thermal printer, a laser printer, or an ink-jet printer and an image processing control section. It subjects, for example, image data to be recorded to various types of image processing such as smoothing processing and recording-density correction processing, converts it into high-resolution image data, and outputs it onto a record sheet. An encoding/decoding section 110 encodes raw image data (e.g., Modified Huffman (MH), Modified Read (MR), Modified Modified Read (MMR), Joint Bi-Level Image Experts Group (JBIG), or Joint Photographic Experts Group (JPEG)), and decodes encoded image data into raw image data.

A communication control section 111 includes, for example, a modem and an NCU (network control unit). It sends and receives, for example, image information to and from an apparatus serving as a communication partner via a communication line 11.

A USB function control section 112 carries out communication control of a USB interface 30. It carries out protocol control in accordance with the USB communication standard. The USB function control section 112 converts data from a USB control task executed by the system control section 101 into a packet and transmits a USB packet to an external information processing terminal 20. The USB function control section 112 also converts a USB packet from the external information-processing terminal into data and transmits it to the system control section 101 via the system bus 120. It is assumed that transmission and reception of these various control commands and data are carried out using a known method, and thus details of the transmission and reception method are not described herein.

Figure 2:
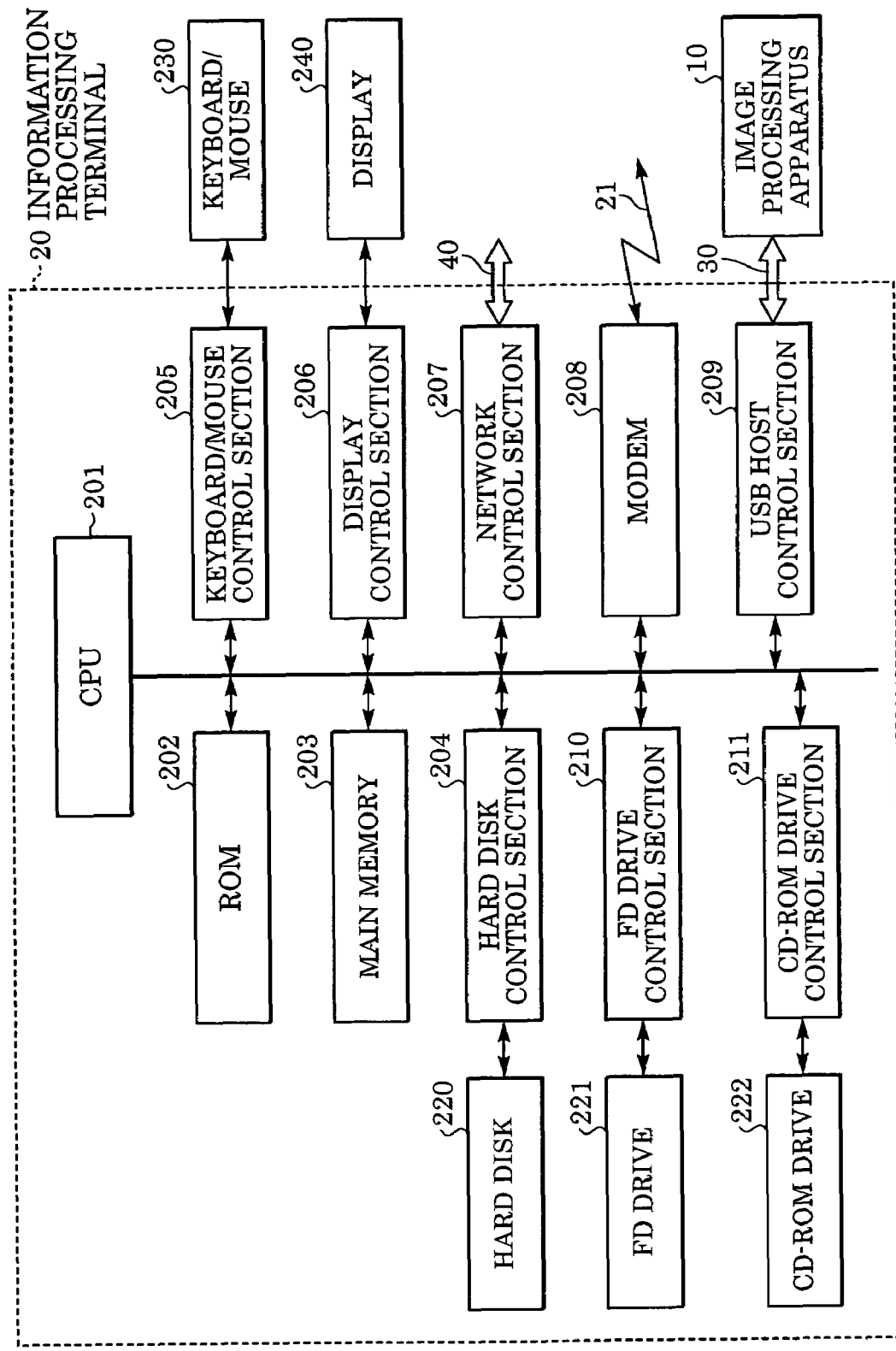
FIG. 2 is a block diagram depicting the basic structure of the information processing terminal shown in FIG. 1.

FIG. 2 is a block diagram depicting the basic structure of an information processing terminal 20 (shown in FIG. 1).

The information processing terminal 20 includes a CPU 201 that controls the operation of the information processing terminal 20 via a system bus according to a program stored in a ROM 202, a main memory 203, or a hard disk 220 or a program read out from a floppy disk (FD) drive 221 or a CD-ROM (compact disk-ROM) drive 222. The ROM 202 stores, for example, a control program of the CPU 201.

The main memory 203 temporarily stores a program and image data to speed up processing by the information processing terminal 20. A hard disk control section 204 controls the hard disk 220. The hard disk 220 stores the operating system, various application programs, image data, and so on. Application software and driver software for transmitting and receiving various control commands and data to and from the image processing apparatus 10 are installed in the hard disk 220. Typically, these application software and driver software are installed in the hard disk 220 from another computer-readable medium storing these application software and driver software via, for example, the FD drive 221 or CD-ROM drive 222. These application software and driver software can also be downloaded into the hard disk 220 via a network control section 207 and a modem 208.

A keyboard/mouse control section 205 controls a keyboard/mouse 230, functioning as a device for inputting instructions from an operator. A display control section 206 controls a display 240 that presents an operator with various types of visual information. The network control section 207 controls communication with a network (not shown) via a network I/F 40. It is assumed that connection to the network is carried out using a known method, and thus details of the connection method are not described herein.

The modem 208 connects to a provider via a communication line 21 and sends/receives data and image information to/from an apparatus serving as a communication partner. A USB host control section 209 carries out communication control of the USB interface 30. In accordance with the USB communication standard, the USB host control section converts data from the CPU 201 into a packet and transmits a USB packet to the image processing apparatus 10 via the USB interface 30. The USB host control section 209 also converts a USB packet from the image processing apparatus 10 into data and transmits it to the CPU 201. It is assumed that the communication control method is based on a known method, and thus details of the communication control method are not described herein. A FD drive control section 210 controls the FD drive 221.

A CD-ROM drive control section 211 controls the CD-ROM drive 222.

Figure 3:
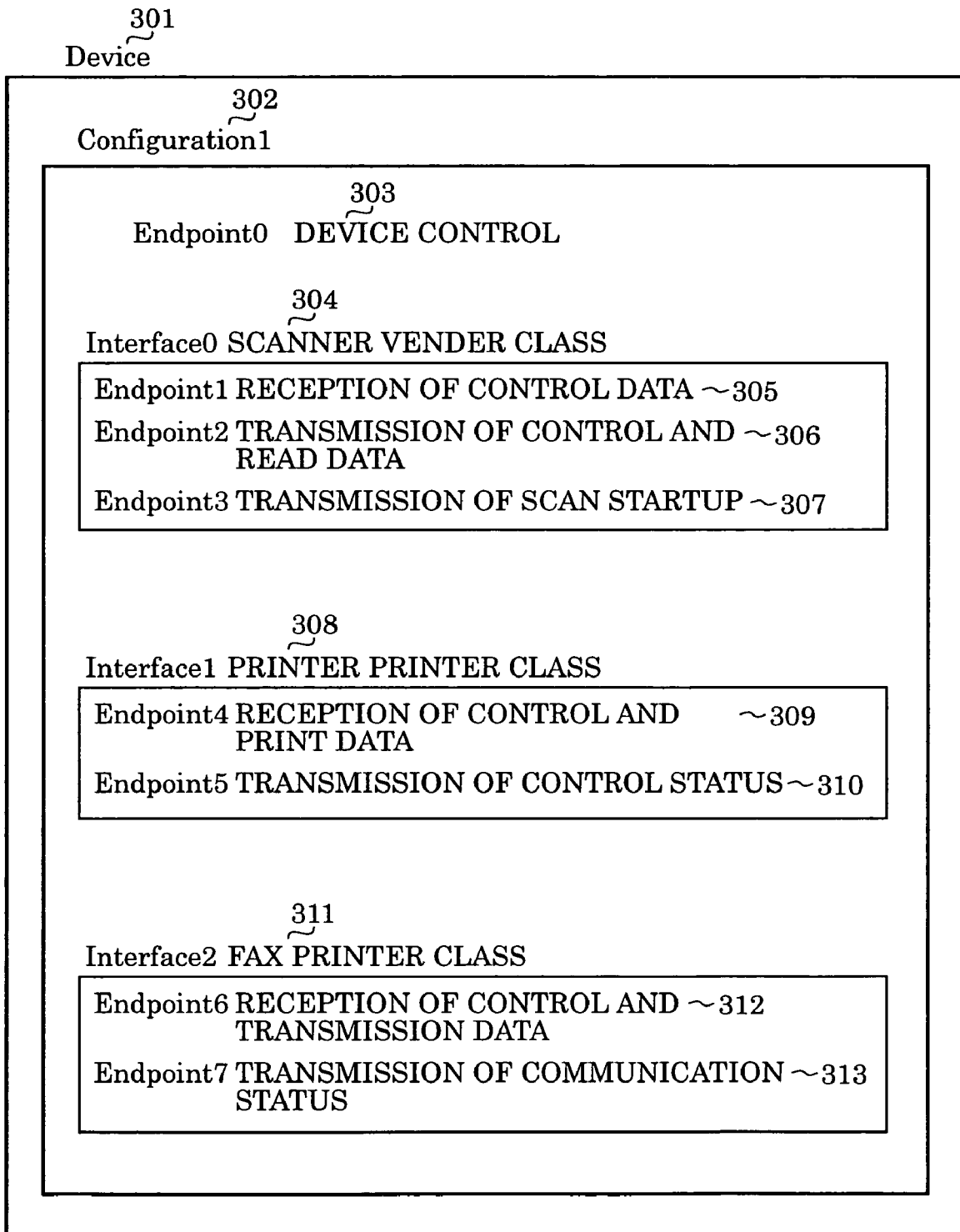
FIG. 3 is a diagram depicting the structure of a USB function control section.

The USB standard will now be described with reference to FIG. 3. From the viewpoint of software configuration, devices are treated as "objects". More specifically, a device is a representative of a class "device objects", and the basic framework is determined. The framework of the entire device is defined as a "device framework". The most fundamental device class includes an end point and an interface. This basic structure is defined as a configuration including only one elementary function defined by one interface. This elementary function includes some end points, each of which is viewed as a USB communication entity. The framework of a multifunction device will now be described with reference to FIG. 3. Referring to FIG. 3, a plurality of interfaces (304, 308, and 311) are defined as a configuration 302, and they serve as function blocks that operate individually. In short, a multifunction device including a plurality of elementary functions is defined.

FIG. 3 is a diagram depicting the structure of the USB function control section 112 according to an embodiment of the present invention. FIG. 3 is a block diagram of logical software functions defined in accordance with the USB standard. In the USB communication standard, only one Device 301, as enclosed by the largest box, can be defined. The Device 301 indicates attributes of the entire device. Attributes of the Device 301 are expressed in a Device Descriptor, which includes the manufacturer ID, product ID, release number, number of configurations, etc. of the device. In this embodiment, the number of Configurations is "1".

In the Device 301, only one configuration (Configuration1 302) is defined. Attributes of the Configuration1 302 are expressed in a Configuration Descriptor, which includes the number of interfaces in the configuration etc. In this embodiment, the number of interfaces is "3". In the Configuration1 302, three interfaces (Interface0 304, Interface1 308, and Interface2 311) are defined.

Attributes of each of the Interface0 304, Interface1 308, and Interface2 311 are expressed in an Interface Descriptor, which includes the number of endpoints, class code, etc. in the interface. In this embodiment, the number of endpoints in the Interface0 304 used for the scanner is "3", and the class code is a vender class (0xFF). The number of endpoints in the Interface1 308 used for the printer is "2", and the class code is a printer class (0x07). The number of endpoints in the Interface2 311 used for FAX transmission/reception is "2", and the class code is a printer class (0x07).

In the Interface0 304 used for the scanner, three Endpoints (Endpoint1 305, Endpoint2 306, and Endpoint3 307) are defined. Attributes of each of the Endpoint1 305, Endpoint2 306, and Endpoint3 307 are expressed in an Endpoint Descriptor, which includes the endpoint number, communication direction, transfer type, packet size, etc. of the endpoint. The Endpoint1 305 is used mainly to receive control data. The Endpoint2 306 is used mainly to transmit control data and read-out data. The Endpoint3 307 is used mainly to report that a command for starting scanning has been issued.

In the Interface1 308 used for the printer, two Endpoints (Endpoint4 309 and Endpoint5 310) are defined. Attributes of each of the Endpoint4 309 and Endpoint5 310 are expressed in an Endpoint Descriptor, which includes the endpoint number, communication direction, transfer type, packet size, etc. of the endpoint. The Endpoint4 309 is used mainly to receive control data and print data. The Endpoint5 310 is used mainly to transmit the print status of received print data.

In the Interface2 311 used for FAX transmission, two Endpoints (Endpoint6 312 and Endpoint7 313) are defined. Attributes of each of the Endpoint6 312 and Endpoint7 313 are expressed in an Endpoint Descriptor, which includes the endpoint number, communication direction, transfer type, packet size, etc. of the endpoint. The Endpoint6 312 is used mainly to receive control data and FAX transmission data. The Endpoint7 313 is mainly used to transmit the communication status of FAX transmission.

With these structures, the first time the image processing apparatus 10 is connected to the information processing terminal 20, necessary drivers can be installed through an automation mechanism called "plug and play" provided by the Microsoft Windows® OS in the information processing terminal 20. Once the necessary drivers have been installed, the drivers allow the image processing apparatus 10 to function as a printer, scanner, PC FAX, etc. A detailed installation procedure will be described later with reference to FIG. 5.

FIG. 4 is a drawing depicting identifier information included in the USB function control section 112 according to the above-described embodiment. A device ID 401 for the Interface1 308 used for the printer and a device ID 402 for the Interface2 311 used for the FAX each include MFG indicating a company name, MDL indicating a model name, CMD indicating a command name, CLS indicating a class, and DES indicating display information. In this embodiment, PRINTER representing the printer class is used for both the CLSs. When this information is sent to the information processing terminal 20, the information processing terminal 20 determines which driver(s) should be installed, as described below.

Figure 5:
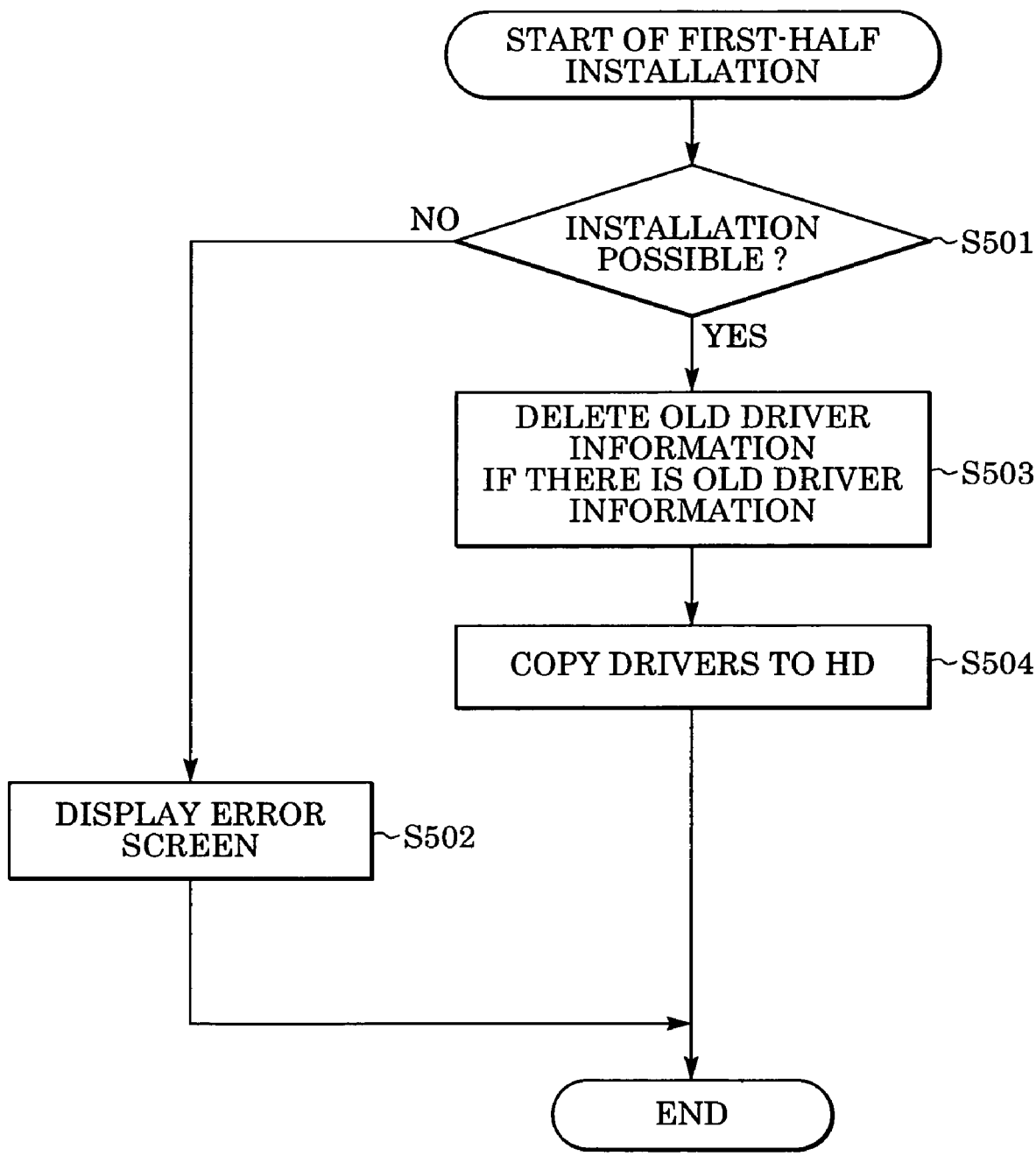
FIG. 5 is a flowchart illustrating the first-half of driver installation processing in the information processing terminal.

FIG. 5 is a flowchart illustrating the first-half driver installation processing in the information processing terminal 20. Software that carries out installation (installer) is typically supplied in the form of a program stored on a medium, such as the hard disk 220 or a CD-ROM inserted in the CD-ROM drive 222. A startup program started by an operation performed by the operator causes the program to be loaded into the main memory 203 by the CPU 201, which is an example of a computer, in the information processing terminal 20, which is one example of an information processing apparatus. The program is then executed by the CPU 201. In FIG. 5, for example, when a CD-ROM is inserted in the CD-ROM drive 222, the installer program can be automatically started up. The installer can also be started up after it has been downloaded into the hard disk 220 via the network control section 207 and modem 208.

When installation is started, it is determined in step S501 whether the above-described program can be installed. For this purpose, the above-described program checks the remaining capacity of the hard disk 220 in the information processing terminal 20, the capacity of the main memory 203, the type of the installed OS (Operating System), etc. If it is determined in step S501 that installation is not possible, an error screen is displayed (step S502) and processing ends. On the other hand, if it is determined in step S501 that installation is possible, it is determined whether there is old driver information in the information processing terminal 20. If it is determined that there is old driver information, the old driver information is deleted (step S503). This is because old driver information may prevent the subsequent installation procedure from proceeding normally. Thereafter, drivers necessary for the installation are copied to the hard disk 220 (step S504). This copying can be performed by the use of, for example, an application programming interface (API) known as SetupCopyOEMInf in the case of the Windows® OS.

The drivers that have been copied include INF files. The INF file for the printer driver contains character strings corresponding to the MFG and MDL character strings in the device ID 401 for the Interface1 and a file name to be installed for the printer driver. Likewise, the INF file for the FAX driver contains character strings corresponding to the MFG and MDL character strings in the device ID 402 for the Interface2 and a file name to be installed for the FAX driver.

Figure 6:
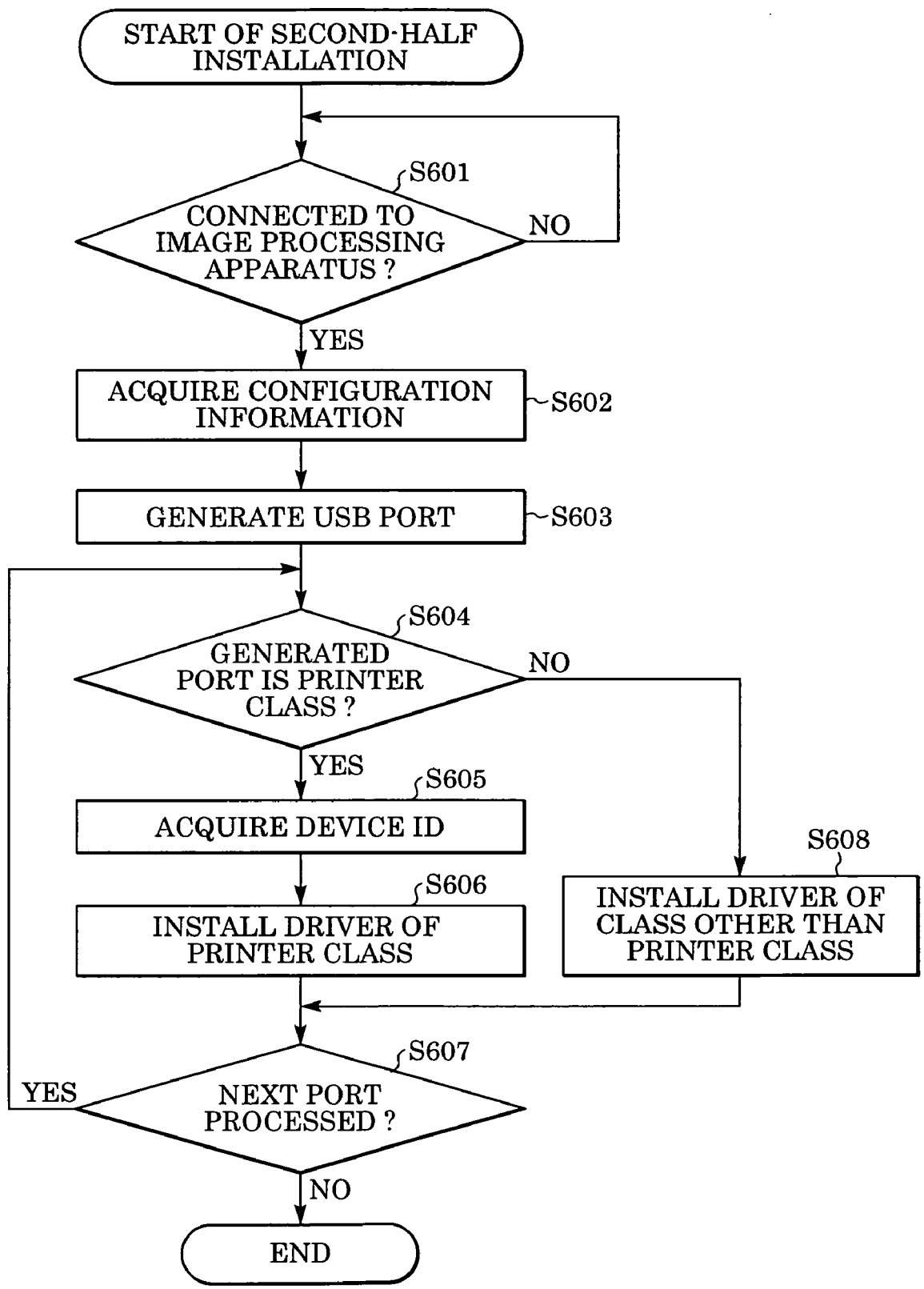
FIG. 6 is a flowchart illustrating the second-half of driver installation processing in the information processing terminal.

FIG. 6 is a flowchart illustrating the second-half driver installation processing in the information processing terminal 20, which is one example of an information processing apparatus. The processing shown in FIG. 6 is carried out by the same program as that used for the processing in FIG. 5. The storage location of the program and other conditions are the same as those in FIG. 5, and the read-out processing is also performed in the same manner as in FIG. 5. In step S601, connection of the image processing apparatus 10 is awaited. Connection of the image processing apparatus 10 is detected by the USB host control section 209. If the above-described program determines in step S601 that connection of the image processing apparatus 10 has been detected by executing the CPU 201, then in step S602 the CPU 201 issues commands for acquiring device configuration data (Get_Device_Descriptor command, Get_Configuration_descriptor command, Get_String_Descriptor command) through the above-described mechanism called "plug and play", based on the processing of the above-described program, to acquire the configuration information of the image processing apparatus 10. As a result of the above-described commands being issued, the information shown in FIG. 3 can be acquired one piece of information at a time or all at once. The above-described program generates USB ports corresponding to the acquired manufacturer IDs, product IDs, and interface numbers of the device in the Device Descriptor (step S603). In this embodiment, a port for the Interface0 for the scanner, a port for the Interface1 for the printer, and a port for the Interface2 for the FAX are generated. As information regarding the ports, the class codes in the above-described Interface Descriptor are stored in the HDD of the information processing terminal 20.

In step S604, it is determined whether a generated port is for the printer class. If the port is for the printer class, then in step S605 the device ID character string shown in FIG. 4 is acquired with the Get_Device_ID command. From the MFG/MDL information in the device ID character string, a search is made for information matching the MFG/MDL information in the INF files copied to the hard disk 220 in step S504. Then, driver files described in the matching INF files are installed (step S606).

Next, the above-described program determines whether there is a subsequent new port (step S607). If it is determined that there is a subsequent port, the flow returns to step S604, where driver installation is repeated.

If it is determined in step S604 that the generated port is not for the printer class, installation is carried out based on the mechanism of the corresponding class (step S608). In this manner, the scanner driver, the printer driver, and the FAX driver are installed for the Interface0, the Interface1, and the Interface2, respectively. The processing described above is repeated until it is determined in step S607 that there are no more ports to process.

As described above, the information processing apparatus capable of executing plug and play processing for starting up one installation operation upon acquiring one device identification information item can be embodied as the information processing terminal 20 having the following features. That is, when the image processing apparatus 10 (one example of a peripheral device) is connected, the information processing terminal 20 acquires at least one device configuration data item (one example of device identification information) including a plurality of configuration information items (e.g., MFG:XXX; MDL:YYY(Printer); CMD:Printer Language; CLS:PRINTER; DES:XXX YYY(Printer) shown in FIG. 4) for logical interfaces (Interface1 and Interface2 shown in FIGS. 3 and 4). Then, when the program acquires device identification information transferred from the image processing apparatus 10, the information processing terminal 20 uses the plurality of configuration information items included in the device configuration data to control the execution of installation of the plurality of device drivers for the logical interfaces. According to one aspect of the present invention, an image processing apparatus having a plurality of functions in its single body can have a plurality of logical channels without an internal USB HUB. Because of this, the image processing apparatus can be inexpensive. According to another aspect of the present invention, header information for command identification is eliminated, and therefore, control is simplified and performance is enhanced.

As described above, at step S606, plural kinds of drivers which correspond to the printer class are installed to an information processing apparatus. At step S608, drivers corresponding to other classes are installed. An install program in the information processing apparatus also controls the OS to register registry information corresponding to the drivers installed in a memory of information processing apparatus. Once a plug and play process is invoked, an OS reads out the registry information and displays new additional icons corresponding to the drivers associated with printer class or other class(es) on the display 240 by using registry information.

The processing according to this embodiment shown in FIGS. 5 and 6 is carried out by the apparatuses with the program installed from an external source. A case where the host computer is supplied with information items, including the program, from a storage medium such as a CD-ROM, a flash memory, or a FD or from an external storage medium via the network is also covered by the present invention.

The system or the apparatus can be supplied with a storage medium that records program code (software) for achieving the function according to the above-described embodiment. The program code (software) can also be downloaded to the system or apparatus from an external server (not shown). A computer (or CPU or MPU (micro-processing unit)) of the system or the apparatus loads the program code from the storage medium to execute the program code.

In this case, the program code itself read out from the storage medium realizes the function of the present invention. The storage medium for supplying the program code includes a floppy disk, a hard disk, an optical disk, a magneto-optical disk, a DVD (digital versatile disk), a CD-ROM, a magnetic tape, a non-volatile memory card, a ROM, an EEPROM (Electrically Erasable Programmable Read-Only Memory), and so on.

As described above, the function of the above-described embodiment is achieved with the execution of the program code read by the computer. In addition, the function of the above-described embodiment may also be achieved by the operating system (OS) running on the computer that performs all or part of the processing according to the commands of the program code. Furthermore, the function of the above-described embodiment may also be achieved such that the program code read from the storage medium is written to a memory provided in an expansion card disposed in the computer or an expansion unit connected to the computer and then the CPU provided on the expansion card or the expansion unit performs all or part of the processing based on commands in the program code.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-174059 filed Jun. 11, 2004, which is hereby incorporated by reference herein.

What is claimed is:

1. An information processing apparatus capable of executing plug and play processing for starting up one installation processing operation upon acquiring one piece of device identification information, the information processing apparatus comprising:

an acquisition unit configured to acquire one piece of device identification information including printer identification information and facsimile identification information corresponding to each of a plurality of logical communication interfaces in response to connection of a peripheral device; and an installation control unit configured to control execution of installation of a printer device driver corresponding to one piece of the plurality of logical communication interfaces by using the printer identification information included in the one piece of device identification information and control execution of installation of a facsimile device driver corresponding to one of the plurality of logical communication interfaces by using the facsimile identification information included in the one piece of device identification information when the acquisition unit acquires the one piece of device identification information from the peripheral device and the installation is executed by using the one piece of device identification information including the printer identification information and the facsimile identification information.

2. The information processing apparatus according to claim 1, wherein the information processing apparatus communicates with the peripheral device via the plurality of logical communication interfaces belonging to a same class specified in a universal serial bus.

3. The information processing apparatus according to claim 1, wherein the installation control unit sets the plurality of logical communication interfaces to control a plurality of functions of the peripheral device corresponding to the printer device driver and the facsimile device driver, following installation of the printer device driver and the facsimile device driver.

4. The information processing apparatus according to claim 1, wherein the peripheral device includes a facsimile function and a printer function, and the installation control unit controls execution of an operating system to install a facsimile control program and a printer control program as the plurality of device drivers.

5. The information processing apparatus according to claim 1, wherein the peripheral device includes a communication unit for bidirectionally connecting to the information processing apparatus, and the communication unit communicates using a plurality of logical channels for each function and at least two logical channels belonging to a same class are defined.

6. The information processing apparatus according to claim 5, wherein the plurality of logical communication interfaces comply with a universal serial bus communication standard, and each of the plurality of logical channels is a logical communication interface in compliance with a universal serial bus.

7. The information processing apparatus according to claim 5, wherein the class is a printer class, and the one piece of device identification information is device ID information.

8. An information processing method capable of executing plug and play processing for starting up one installation processing operation upon acquiring one piece of device identification information, the information processing method comprising steps of:
   acquiring one piece of device identification information including printer identification information and facsimile identification information corresponding to each of a plurality of logical communication interfaces in response to connection of a peripheral device; and
   controlling execution of installation of a printer device driver corresponding to one piece of the plurality of logical communication interfaces by using the printer identification information included in the one piece of device identification information and controlling execution of installation of a facsimile device driver corresponding to one of the plurality of logical communication interfaces by using the facsimile identification information included in the one piece of device identification information when the acquisition unit acquires the one piece of device identification information from the peripheral device and the installation is executed by using the one piece of device identification information including the printer identification information and the facsimile identification information.

9. The information processing method according to claim 8, wherein the method is performed in an information processing apparatus that communicates with the peripheral device via the plurality of logical communication interfaces belonging to a same class specified in a universal serial bus.

10. The information processing method according to claim 9, wherein, in controlling execution of installation, the plurality of logical communication interfaces are set to control a plurality of functions of the peripheral device corresponding to the printer device driver and the facsimile device driver, following the installation of the printer device driver and the facsimile device driver.

11. A computer-readable medium having stored thereon a computer program for causing a computer to execute the information processing method according to claim 10.

12. A computer-readable medium having stored thereon a computer program for causing a computer to execute the information processing method according to claim 9.

13. The information processing method according to claim 8, wherein, in controlling execution of installation, the plurality of logical communication interfaces are set to control a plurality of functions of the peripheral device corresponding to the printer device driver and the facsimile device driver, following the installation of the printer device driver and the facsimile device driver.

14. A computer-readable medium having stored thereon a computer program for causing a computer to execute the information processing method according to claim 13.

15. The information processing method according to claim 8, wherein the peripheral device includes a facsimile function and a printer function, and in controlling execution of installation, execution of an operating system is controlled to install a facsimile control program and a printer control program as the plurality of device drivers.

16. A computer-readable medium having stored thereon a computer program for causing a computer to execute the information processing method according to claim 15.

17. A computer-readable medium having stored thereon a computer program for causing a computer to execute the information processing method according to claim 8.

* * * * *